United States Patent Office 2,929,852
Patented Mar. 22, 1960

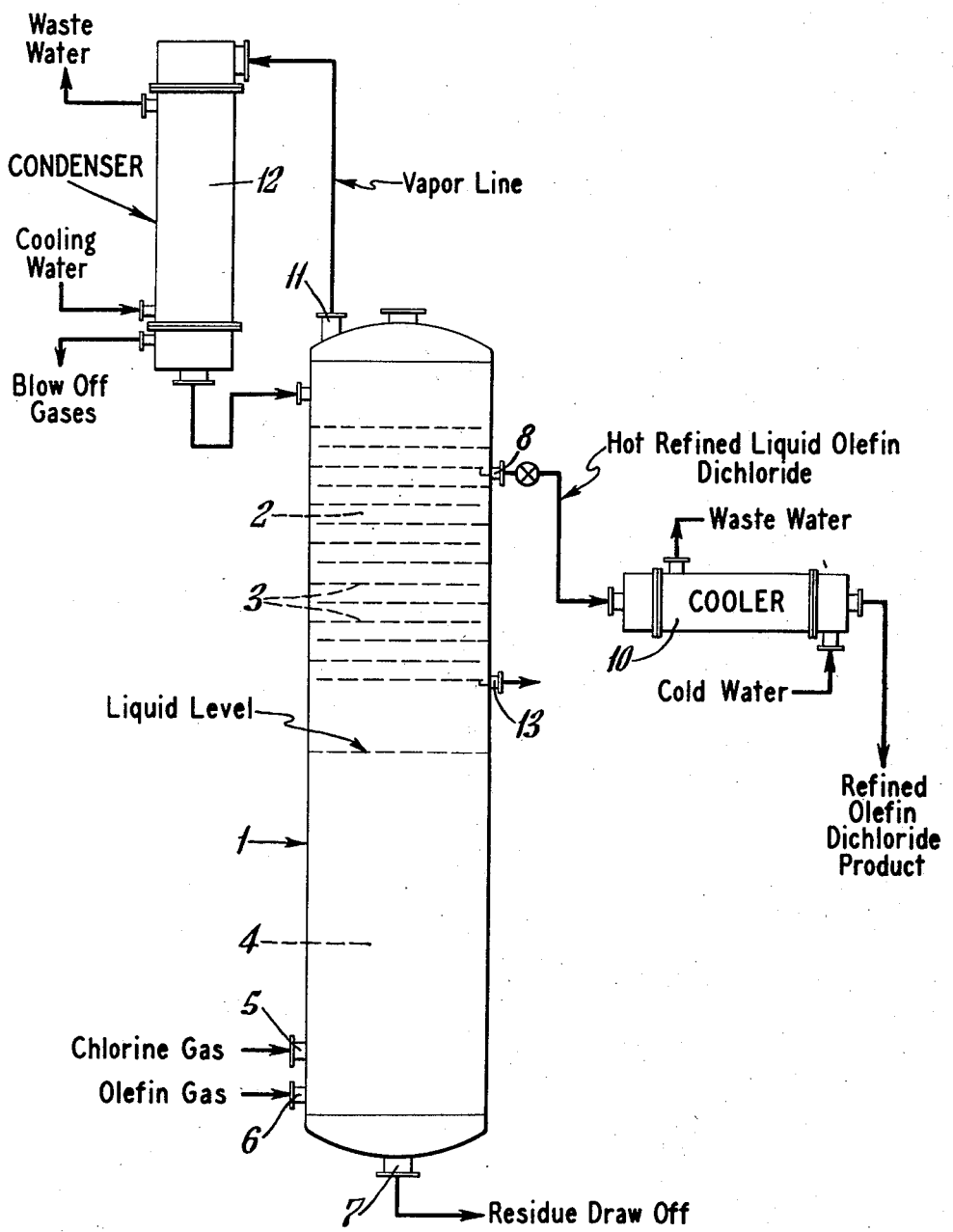

2,929,852

PROCESS FOR THE PREPARATION OF OLEFIN DICHLORIDES

Donald B. Benedict, Chappaqua, N.Y., assignor to Union Carbide Corporation, a corporation of New York Application October 20, 1954, Serial No. 463,440

6 Claims. (Cl. 260—660)

This invention relates to an improved process for preparing olefin dichlorides. More particularly, the invention relates to a process whereby substantially pure olefin dichlorides may be prepared from the liquid phase reaction of an olefin with chlorine.

Olefin dichlorides such as ethylene dichloride are prepared commercially by processes which include the reaction of ethylene and chlorine within a body of liquid ethylene dichloride. The reactions are highly exothermic and, consequently, the processes are conducted in vessels provided with suitable cooling means to remove the heat of reaction as well as to maintain the temperature in the reaction medium below its boiling point. Such processes are made continuous by providing a liquid product draw-off line from the reaction vessel and adjusting the rate at which the product is withdrawn to that at which the product is formed.

The above processes do not lead to the preparation of substantially pure olefin dichlorides. It has been found that no matter how carefully the reaction conditions are controlled contamination of the product results through the occurrence of other reactions. Therefore, the olefin dichloride product contains considerable amounts of more highly chlorinated and low boiling materials which make such products unsuitable for many commercial uses. By way of illustration, ethylene dichloride made by the above processes is contaminated with more highly chlorinated materials and low boiling by-products to an extent requiring purification before use as a starting compound in the preparation of vinyl chloride.

The present invention is based upon my discovery that olefin dichlorides of a high degree of purity i.e. free of side reaction products, may be directly obtained from the liquid phase reaction of an olefin with chlorine in a body of the liquid olefin dichloride. Thus, refining procedures heretofore employed can be eliminated with consequent saving in time and expense.

Olefin dichlorides are prepared in accordance with the present invention by conducting the liquid phase reaction of an olefin with chlorine in a body of the olefin dichloride to be produced and utilizing the exothermic heat of reaction to vaporize the liquid olefin dichloride reaction medium, conducting said vapors to a rectification section, separating olefin dichloride from side reaction products formed along with said olefin dichloride and removing refined olefin dichloride in the liquid phase from said rectification section.

By utilizing the exothermic heat of reaction to vaporize the liquid olefin dichloride reaction medium, the system provides for direct control of the reaction temperature. This, of course, obviates the necessity of and the difficulties encountered with cooling apparatus presently employed in such liquid phase reactions. Moreover, by providing for the rectification of the vaporized reaction medium the system allows the continuous and immediate withdrawal of the products of the reaction and provides for the recovery of an olefin dichloride free of side reaction products.

The temperature at which the reaction is conducted may include any temperature at which a portion of the olefin dichloride medium, into which the olefin and chlorine are introduced, will vaporize under the pressure conditions employed. Preferably, the liquid phase reaction of the olefin and chlorine is conducted at temperatures of from about 80° C. to about 120° C. With respect to the pressure employed, the reaction may be effected at any desired pressure so long as a portion of the olefin dichloride medium within which the olefin and chlorine react to produce additional quantities of said medium will vaporize as a result of the exothermic heat of reaction. Desirably, pressures of from about 0 to about 25 pounds per square inch gauge may be employed and preferably a pressure of from 1 to about 10 pounds per square inch gauge is maintained.

The reactants may be supplied to the olefin dichloride reaction medium in stoichiometric amounts. However, it is preferred that the reactants be supplied in such proportions that there is an excess of olefin over and above the stoichiometric amount required to react with the chlorine to prepare the olefin dichloride. In this manner the tendency of substitution reactions occurring during the process is markedly decreased. While the amount of the excess of the olefin introduced to the olefin dichloride medium is not critical, I employ the reactants in an olefin to chlorine mole ratio of from about 1.1 to 1 to about 1.3 to 1.

As is known, the liquid phase reaction of an olefin and chlorine is conducted, in most instances, in the presence of a catalyst. Consequently, in the process of the instant invention any of the well known catalysts generally associated with such reactions, as for example, the metal chlorides such as the chlorides of iron, antimony and copper, may be employed effectively. The specific catalyst actually employed constitutes no part of the invention.

The process of the invention may be conducted in a reactor provided with a rectification section. The equipment employed should have a reasonable resistance to corrosion from the reactants and the reaction products. Steel equipment is usually satisfactory. The rectification section of the reactor may comprise a series of bubble cap trays or sieve plates or it may comprise a column packed with Raschig rings or other suitable packing material normally employed in rectification equipment. The specific structure and other details of the rectification section actually employed may be readily determined by those familiar with rectification procedures.

The invention may be further described with reference to the drawing which diagrammatically illustrates typical equipment that may be employed for conducting the process. A reactor 1 is provided at the upper end thereof with a rectification section 2 consisting of a series of bubble cap trays 3. The lower portion 4 of the reactor comprises the reaction section and is provided with an inlet 5 for the introduction of chlorine to the reaction section and an inlet 6 for the introduction of an olefin to the reaction section. As shown in the drawing, the chlorine inlet 5 is preferably positioned above the olefin inlet 6. The extreme base of the reactor 1 is provided with an outlet 7 to permit withdrawal of the reaction residue. Product outlet 8 is provided in the reactor 1 at an appropriate position, with respect to the bubble cap trays of the rectification section, where substantially pure liquid olefin dichloride product may be withdrawn and led to a cooler 10. An outlet 11 is provided at the head of the reactor 1 to permit uncondensed vapors ascending from the rectification section 2 to pass through a vapor line to condenser 12. The condensed vapors after leaving condenser 12 are returned to the head of the reactor to serve as reflux. An outlet 13 may be provided in the reactor wall to permit removal of side reaction products from the bottom bubble cap tray of the rectification section.

To prepare ethylene dichloride by the process of the invention, the reaction section of the reactor is filled to a point slightly below the bottom bubble cap tray with ethylene dichloride and a small amount of a catalyst is added thereto. Chlorine and ethylene gases enter the reaction section 4 through inlets 5 and 6 and may be diffused into the liquid ethylene dichloride by means of perforated tubes (not shown). Shortly after the reaction commences, the exothermic heat thereof is sufficient to cause vaporization of a portion of the ethylene dichloride reaction medium. In addition to ethylene dichloride, the reaction between ethylene and chlorine results in the preparation of 1,1,2-trichloroethane and similar polychlorinated products as well as other more volatile chlorinated by-products. Hydrochloric acid is another by-product of the process. Thus, the reaction medium is comprised of substances other than ethylene dichloride and consequently, the vapors therefrom, passing to the rectification section 2, comprise a mixture of materials. Uncondensed vapors passing from the rectification section 2 are led through the vapor line to condenser 12. The condensed vapors are returned to the head of the reactor and serve as reflux while the uncondensed gases which issue from the condenser are blown off. The vapors passing to the condenser may contain small amounts of impurities such as ethyl chloride or vinyl chloride which may be removed in a small liquid stream from the condenser or which may be blown off with other uncondensed gases by running the condenser at a higher temperature.

Refined liquid ethylene dichloride can be withdrawn in the liquid phase from the rectification section at an appropriate bubble cap tray as shown in the drawing and cooled. The rate of withdrawal of refined ethylene dichloride is such as to hold the volume of the reaction medium constant and the remaining portion of the prepared ethylene dichloride is returned as reflux to the reaction section. Side reaction products such as 1,1,2-trichloroethane may be removed with some ethylene dichloride from the rectification section at the bottom bubble cap tray through outlet 13. Or, if desired, the trichloroethane product may be removed through outlet 7 at the base of the reactor.

One embodiment of my invention includes conducting the olefin dichloride vapors passing from the reaction section through the rectification zone, where they are rectified, and thereafter directing such vapors to the condenser where they may be condensed and recovered as liquid ethylene dichloride. A product prepared by this embodiment is likely to contain some low boiling products which are not particularly undesirable for certain commercial uses of olefin dichlorides.

The following example is illustrative of the invention.

*Example I*

A reactor comprising a reaction section and a rectification section, as described above and as disclosed in the drawing, was employed to react ethylene and chlorine. This reactor was 7 feet in diameter and was of a height of 43 feet. The rectification section comprised a series of 16 conventional bubble cap trays, spaced at intervals of 12 inches. A condenser was mounted over the reactor and so positioned that vapor condensed therein returned to the reactor by gravity flow. The reactor was filled with dry ethylene dichloride to a point about 3 feet below the bottom bubble cap tray of the rectification section. The amount of ethylene dichloride employed was approximately 4000 gallons. A small amount of ferric chloride was added and the unit then purged thoroughly with ethylene. Ethylene and chlorine were then admitted to the reaction zone at a slow rate in a mole ratio of 1.2 to 1.0 respectively. The rate was gradually increased until refluxing commenced. The heat of the reaction controlled the reflux of the system and under the conditions employed and with the equipment used a reflux ratio of approximately 5:1 was established at a temperature of 90° C. and at a pressure of 7 pounds per square inch gauge. Refined liquid ethylene dichloride was removed from the rectification section at the third bubble cap tray from the top. The volume of the liquid ethylene dichloride reaction medium in the reaction zone was maintained essentially constant by removing refined ethylene dichloride from the rectification section at a rate comparable to that at which it was prepared by the reaction. The remaining portion of the prepared ethylene dichloride was returned as reflux to the reaction section. Analysis of the ethylene dichloride product obtained was as follows:

| | |
|---|---|
| Specific gravity | 1.2557 at 20/20° C. |
| Initial boiling point | 83.2° C. at 760 mm. |
| Mid boiling point | 83.5° C. at 760 mm. |
| Dry boiling point | 83.7° C. at 760 mm. |
| Percent HCl | .0023. |
| Percent $H_2O$ | .0034 |

This product was of sufficient purity as to come within the specifications required for the grade of ethylene dichloride employed in the manufacture of vinyl chloride by pyrolysis.

Other olefins, such as propylene, butylene, and the like may also be chlorinated to their corresponding dichlorides by employing the process of this invention.

What is claimed is:

1. A process for producing an olefin dichloride by reaction of an olefin and chlorine which comprises introducing an olefin and chlorine into a reaction zone containing a body of boiling liquid consisting primarily of olefin dichloride, maintaining the body of liquid boiling by means of the heat of reaction liberated by the reaction of chlorine with olefin thereby vaporizing olefin dichloride from the liquid body, and while forming olefin dichloride in the liquid body withdrawing olefin dichloride vapors and other chlorinated products therefrom, rectifying said olefin dichloride vapors in a rectification zone above the reaction zone which is located above the liquid body, separating olefin dichloride from said other chlorinated products by rectification, removing refined olefin dichloride in the liquid phase from said rectification zone at a point below the top of said rectification zone and removing olefin dichloride vapors containing impurities from above said rectification zone.

2. A process for producing ethylene dichloride by reaction of ethylene and chlorine which comprises introducing ethylene and chlorine into a reaction zone containing a body of boiling liquid consisting primarily of ethylene dichloride, maintaining the body of liquid boiling by means of the heat of reaction liberated by the reaction of chlorine with ethylene thereby vaporizing ethylene dichloride from the liquid body, and while forming ethylene dichloride in the liquid body withdrawing ethylene dichloride vapors and other chlorinated products therefrom, rectifying said ethylene dichloride vapors in a rectification zone above the reaction zone which is located above the liquid body, separating ethylene dichloride from said other chlorinated products by rectification, removing refined ethylene dichloride in the liquid phase from said rectification zone at a point below the top of said rectification zone and removing ethylene dichloride vapors containing impurities from above said rectification zone.

3. A process for producing an olefin dichloride by reaction of an olefin and chlorine which comprises introducing an olefin and chlorine into a reaction zone containing a body of boiling liquid consisting primarily of olefin dichloride containing a small amount of ferric chloride dissolved therein, maintaining the body of liquid boiling by means of the heat of reaction liberated by the reaction of chlorine with olefin thereby vaporizing olefin dichloride from the liquid body, and while forming olefin dichloride in the liquid body withdrawing olefin dichloride vapors and other chlorinated products therefrom, passing said olefin dichloride vapors to a rectification zone located above said reaction zone, separating olefin dichloride from said chlorinated products in said rectification zone, removing olefin dichloride vapors containing impurities from above said rectification zone, condensing said vapors and returning condensed olefin dichloride as reflux to said rectification zone, and removing refined olefin dichloride in the liquid phase from said rectification zone at a point below the top of said rectification zone.

4. A process for producing ethylene dichloride by reaction of ethylene and chlorine which comprises introducing ethylene and chlorine into a reaction zone containing a body of boiling liquid consisting primarily of ethylene dichloride containing a small amount of ferric chloride dissolved therein, maintaining the body of liquid boiling by means of the heat of reaction liberated by the reaction of chlorine with ethylene thereby vaporizing ethylene dichloride from the liquid body, and while forming ethylene dichloride in the liquid body withdrawing ethylene dichloride vapors and other chlorinated products therefrom, passing said ethylene dichloride vapors to a rectification zone located above said reaction zone, separating ethylene dichloride from said chlorinated products in said rectification zone, removing ethylene dichloride vapors containing impurities from above said rectification zone, condensing said vapors and returning condensed ethylene dichloride as reflux to said rectification zone, and removing refined ethylene dichloride in the liquid phase from said rectification zone at a point below the top of said rectification zone.

5. A process as claimed in claim 3 above in which the rate of removal of refined olefin dichloride in the liquid phase is substantially equal to the rate of formation of olefin dichloride in said reaction zone, thus maintaining a constant level of boiling liquid in said reaction zone.

6. A process as claimed in claim 4 above in which the rate of removal of refined ethylene dichloride in the liquid phase is substantially equal to the rate of formation of ethylene dichloride in said reaction zone, thus maintaining a constant level of boiling liquid in said reaction zone.

References Cited in the file of this patent

UNITED STATES PATENTS

| | | |
|---|---|---|
| 2,081,322 | Carney | May 25, 1937 |
| 2,353,563 | Hemminger | July 11, 1944 |
| 2,393,367 | Hammond | Jan. 22, 1946 |
| 2,403,977 | Heard | July 16, 1946 |